United States Patent
Shimada

(10) Patent No.: US 10,974,640 B2
(45) Date of Patent: Apr. 13, 2021

(54) BRAKE LAMP CONTROL DEVICE AND VEHICLE

(71) Applicant: HONDA MOTOR CO., LTD., Tokyo (JP)

(72) Inventor: Takashi Shimada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/523,146

(22) Filed: Jul. 26, 2019

(65) Prior Publication Data
US 2020/0039425 A1 Feb. 6, 2020

(30) Foreign Application Priority Data
Aug. 1, 2018 (JP) .............................. JP2018-144680

(51) Int. Cl.
*B60Q 1/44* (2006.01)
*B60Q 1/30* (2006.01)

(52) U.S. Cl.
CPC .................... *B60Q 1/44* (2013.01); *B60Q 1/30* (2013.01)

(58) Field of Classification Search
CPC . B60Q 1/44; B60Q 1/30; B60Q 1/346; B60Q 1/445; B60Q 1/448
See application file for complete search history.

(56) References Cited

U.S. PATENT DOCUMENTS

| | | | | |
|---|---|---|---|---|
| 3,914,739 A | * | 10/1975 | Caughlin | ................. B60Q 1/44 340/479 |
| 5,909,174 A | * | 6/1999 | Dietz | ................... B60Q 11/002 340/479 |
| 2004/0150355 A1 | * | 8/2004 | Tani | ....................... H05B 45/37 315/247 |
| 2008/0023273 A1 | * | 1/2008 | Toelge | ................... B60Q 1/448 188/1.11 E |
| 2014/0306606 A1 | * | 10/2014 | Sato | ....................... B60Q 11/00 315/77 |
| 2015/0175061 A1 | * | 6/2015 | Mizui | ..................... B60Q 1/44 315/77 |

FOREIGN PATENT DOCUMENTS

| | | |
|---|---|---|
| JP | H04-134748 U | 12/1992 |
| JP | 2004-182148 A | 7/2004 |
| JP | 2006-076421 A | 3/2006 |
| JP | 2012-153294 A | 8/2012 |
| JP | 2015-123755 A | 7/2015 |

OTHER PUBLICATIONS

Japanese Office Action received in corresponding JP application No. 2018-144680 dated Jan. 14, 2020 with English translation (9 pages).

* cited by examiner

*Primary Examiner* — Thai Pham
(74) *Attorney, Agent, or Firm* — Rankin, Hill & Clark LLP

(57) ABSTRACT

A brake lamp control device is provided which includes: a brake state signal output unit configured to output a brake state signal indicative of ON and OFF states of automatic braking operation for a brake of a vehicle; and a turn-on controller configured to control turn-on and turn-off states of a brake lamp on the basis of the brake state signal and turns on the brake lamp for a predetermined interval after the brake state signal becomes the OFF state.

4 Claims, 2 Drawing Sheets

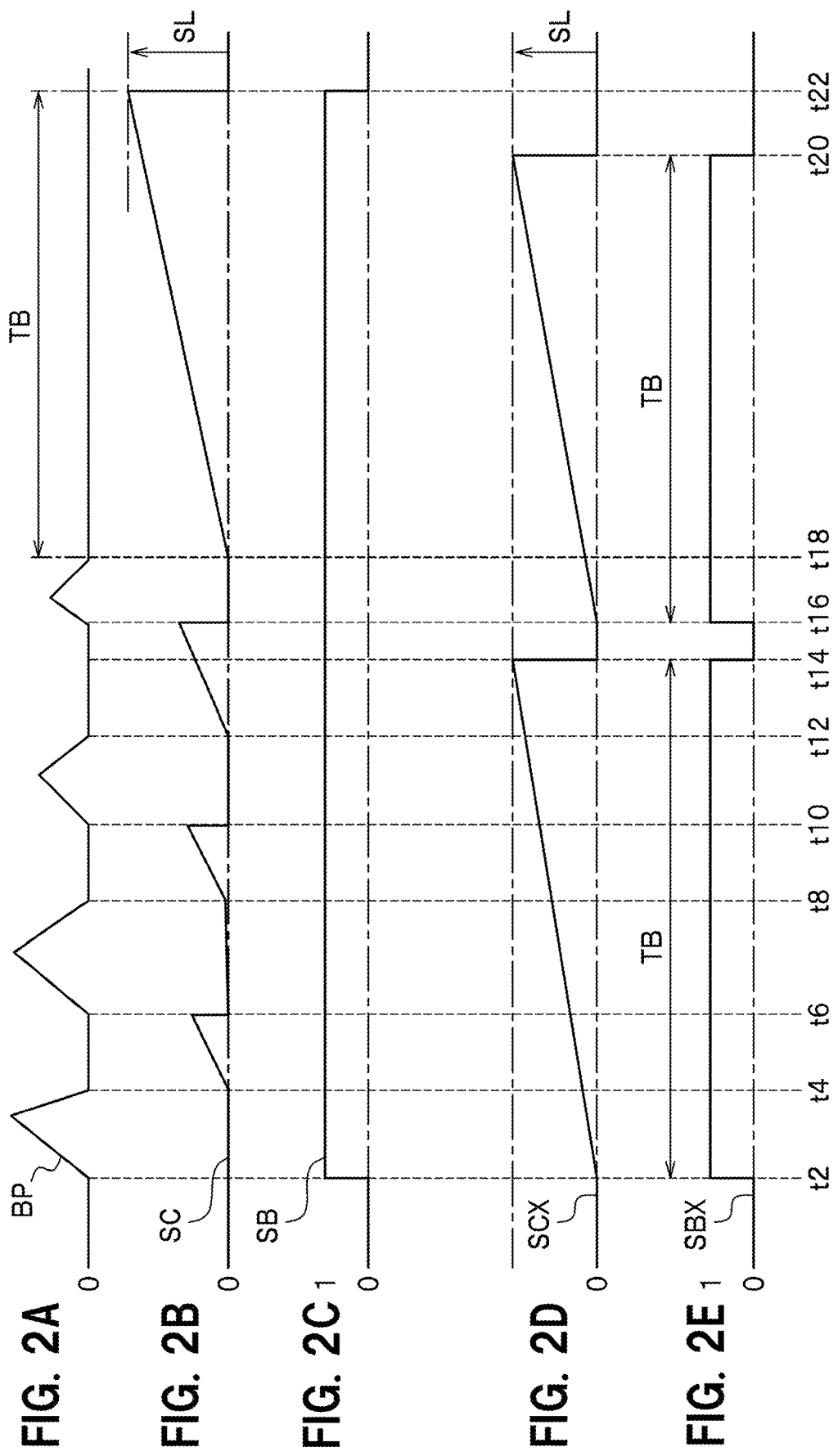

US 10,974,640 B2

BRAKE LAMP CONTROL DEVICE AND VEHICLE

BACKGROUND OF THE INVENTION

1. Field of the Invention

The present invention relates to a brake lamp control device and a vehicle including the same.

2. Description of the Related Art

JP2006-76421 A disclosed at paragraphs 0020, etc. as follows:

A brake lamp is installed at a rear portion of a vehicle. When a driver depresses a brake pedal, or when automatic braking is performed in response to a command from an electronic control unit, the brake lamp is turned on.

SUMMARY OF THE INVENTION

When a driver controls the vehicle to run at a specified speed on a long falling gradient using an ACC (Adaptive Cruise Control/Fix speed Travelling Control and Vehicle Following Distance Control Device), though the vehicle can substantially maintain the specified speed by the engine braking or regenerative braking, there may be cases in which a braking force becomes insufficient. Further on a flatland, an rising gradient, etc. a similar status may occur.

For example, when the vehicle travelling at the specified speed is decelerated, though the speed of the vehicle can approximately reach the specified speed, there may be a case in which the deceleration is insufficient. In this case, the specified speed or a specified deceleration is performed by intermittently operating a main brake device of the vehicle (for example, a hydraulic brake). However, if the hydraulic brake of the vehicle is intermittently operated by the ACC, this is an eyesore for the driver on the following vehicle because the turning on and off of the brake lamp is repeated.

An aspect of the present invention provides a brake lamp control device capable of appropriately turning on the brake lamp.

An aspect of the present invention provides a brake lamp control device comprising: a brake state signal output unit configured to output a brake state signal indicative of ON and OFF states of automatic braking operation for a brake of a vehicle; and a turn-on controller configured to control turn-on and turn-off states of a brake lamp on the basis of the brake state signal and turns on the brake lamp for a predetermined interval after the brake state signal becomes the OFF state.

According to the present invention, the brake lamp may be appropriately turned on.

BRIEF DESCRIPTION OF THE DRAWINGS

FIGS. 2A to 2E show waveforms shown in the vehicle according to the embodiment.

DETAILED DESCRIPTION OF THE INVENTION

Configuration

Figure 1:
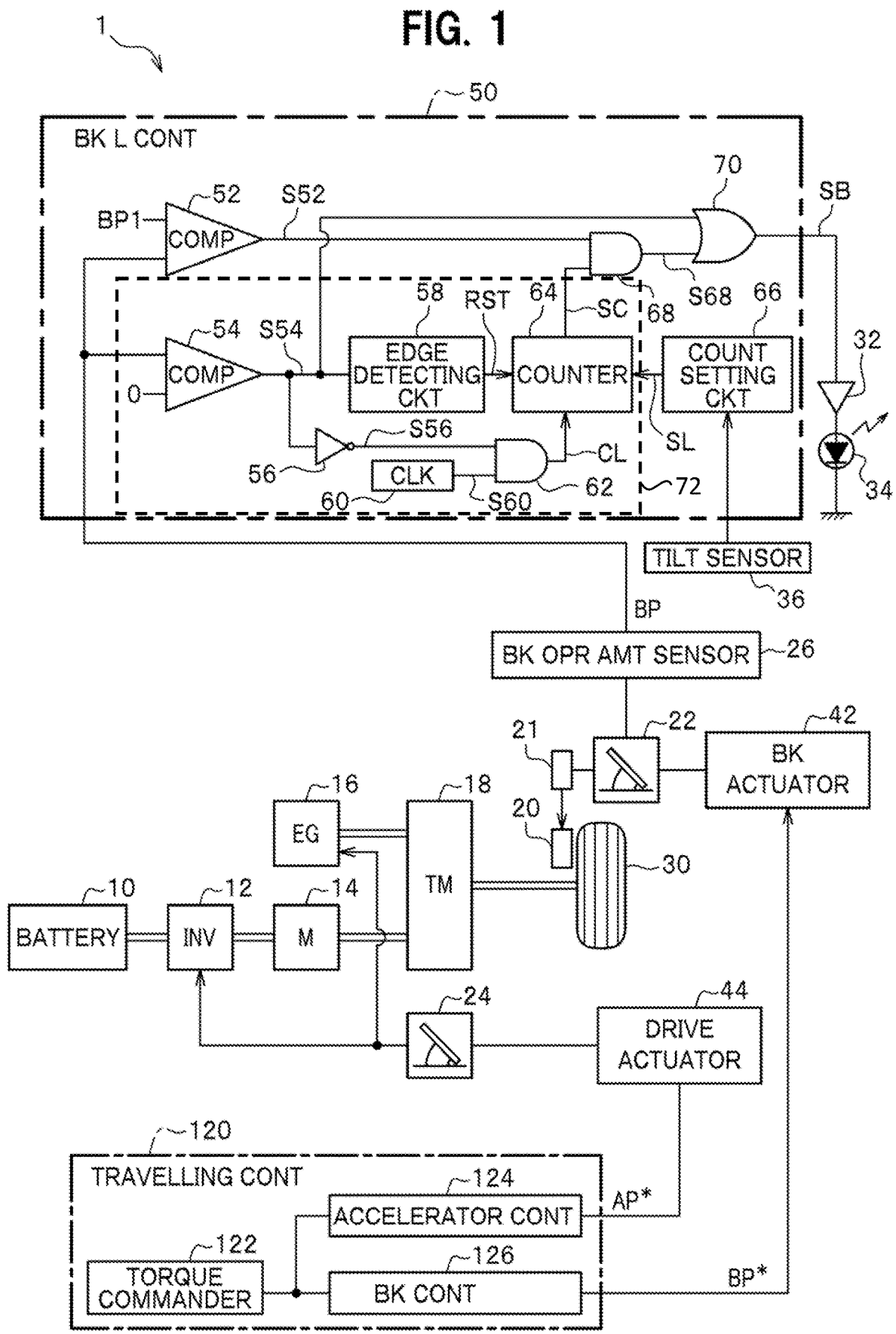
FIG. 1 is a block diagram of an embodiment of a vehicle.

FIG. 1 is a block diagram of an embodiment of a vehicle 1 according to an embodiment of the present invention.

In FIG. 1, the vehicle 1 includes a battery (high voltage battery) 10, an inverter 12, a motor 14, an engine 16, a transmission 18, a brake device 20, a hydraulic mechanism 21, a brake pedal 22, an accelerator pedal 24, a brake operation amount sensor 26, wheels 30, a buffer circuit 32, a brake lamp 34, a tilt sensor (gradient detector) 36, a brake actuator 42, a drive actuator 44, a brake lamp controller 50, and a travelling controller 120.

The battery 10 outputs a dc voltage. The inverter 12 converts the dc voltage into ac voltages by modulating the dc voltage. The engine 16 is, for example, an internal combustion engine. The transmission 18 runs the vehicle 1 by transmitting power generated by the motor 14 or the engine 16 to the wheels 30. The brake device 20 includes a brake disk (not shown) rotating with the wheel 30, and brake pads (not shown) pinch the brake disk with a pressure on surfaces of the disk brake.

When the brake pedal 22 is operated by the driver (not shown), the operation force is transmitted to the brake device 20 through the hydraulic mechanism 21, so that the brake device 20 brakes the vehicle 1. The brake actuator 42 drives the brake pedal 22 in accordance with a brake pedal command value BP* (or a hydraulic command value) for the brake device supplied from a vehicle control device 100. This automatically brakes the vehicle 1 by operating the brake device 20. The brake operation amount sensor 26 detects a brake pedal operation amount (operation amount) BP and outputs an detection signal. The brake pedal operation amount BP is a variable which is zero when the brake pedal 22 is not operated and increases with increase in a pedaling amount of the brake pedal 22. In the example shown in FIG. 1, when the brake actuator 42 is operated, which automatically presses the brake pedal 22.

The accelerator pedal 24 is operated by the driver to have a pedaling amount, which changes an opening degree of the throttle of the engine 16 or changing the output voltage of the inverter 12 to change the driving force transmitted to the wheels 30. The drive actuator 44 changes the pedaling amount of the accelerator pedal 24 in accordance with an accelerator pedal command value AP* supplied by the vehicle control device 100, which changes the drive force transmitted to the wheels 30. In other words, when the drive actuator 44 is operated, the accelerator pedal 24 is automatically pedaled. The tilt sensor 36 comprising an acceleration sensor, etc. detects a gradient of the road on which the vehicle is travelling, in accordance with a gradient of the vehicle 1 in a front-rear direction of the vehicle 1.

The travelling controller 120 includes a torque commander 122, an accelerator controller 124, and a brake controller 126. The torque commander 122 outputs a torque command value for control of auto-cruise and following travel. The torque command value is a value commanding a driving torque or a brake torque and determined based on a detection result of a single-lens camera, a millimeter wave radar, etc (not shown). "Auto-cruise" means travel of the vehicle 1 at a specified cruising setting speed. "Following travel" means to follow a proceeding vehicle (not shown) which is travelling in front of the vehicle 1 with keeping a following distance according to the speed while the accelerator operation and the brake operation are automatically performed within a speed range not greater than the cruise setting speed when there is a proceeding vehicle (not shown) travelling in front of the vehicle 1. The accelerator controller 124 outputs an accelerator pedal command value AP* described above in accordance with the torque command value. The brake controller 126 outputs the brake pedal command value BP* described above in accordance with the torque command value.

The brake pedal operation amount BP outputted by the brake operation amount sensor 26 is a value being zero when the brake pedal 22 is not operated and increasing in accordance with increase in the pedaling amount.

The brake lamp controller 50 includes a comparator (turning off controller) 52, a comparator (brake state signal output unit) 54, a NOT circuit 56, an edge detecting circuit (reset controller) 58, a clock circuit 60, an AND circuit 62, a counter (lighting interval controller) 64, an AND circuit (lighting controller) 68, a count setting circuit (lighting interval controller) 66, and an OR circuit (lighting controller) 70. The comparator 54, the NOT circuit 56, the edge detecting circuit 58, the clock circuit 60, the AND circuit 62, and the counter 64 collectively function as a timer 72 in the brake lamp controller 50.

The comparator 54 outputs a signal S54 being a level of "0" when the brake pedal operation amount BP is zero and a level of "1" when the brake pedal operation amount BP exceeds zero. The brake state signal S54 is a signal indicating an ON/OFF status of the brake (1"/0") and called "brake status signal". The NOT circuit 56 outputs an inverted brake status signal S56 by inverting the brake state signal S54. The clock circuit 60 outputs a clock signal S60 having a predetermined period. The AND circuit 62 performs an AND operation between the inverted brake status signal S56 and the clock signal S60 to supply the AND operation result as a clock signal CL to the counter 64.

The edge detecting circuit 58 generates a one-shot square waveform pulse when the value of the brake state signal S54 changes. The square waveform pulse is supplied to the counter 64 as a reset signal RST. The counter 64 counts the clock signal CL to output a count result SC. When the reset signal RST is supplied to the counter 64, the count result SC is reset to "0". Further, when the count result SC reaches a specified count limit value SL, the count result SC is also reset to "0".

The count setting circuit 66 sets the count limit value SL in accordance with the gradient detected by the tilt sensor 36. More specifically, when the the rising gradient or falling gradient detected by the tilt sensor 36 is smaller than a predetermined value, i.e., when the road is approximetely flat, the count setting circuit 66 sets a first limit value as the count limit value SL. When a rising gradient or a falling gradient having values not smaller than predetermined values is detected by the tilt sensor 36, the count setting circuit 66 sets a second limit value greater than the predetermined first limit value. This is because in the case of the rising gradient or the falling gradient, there is a tendency that a variation period of the brake pedal command value BP* becomes longer than that in the flat road.

The comparator 52 outputs a comparison signal S52 which becomes "1" when the brake pedal operation amount BP is not greater than a predetermined operation amount (first operation amount) BP1 and becomes "0" when the brake pedal operation amount BP exceeds the predetermined operation amount BP1. The operation amount BP1 is a value having such a level as to stop the vehicle 1 or strongly decelerate the vehicle 1.

A comparison signal S52 and the count result SC are supplied to the AND circuit 68. In the AND circuit 68, the count result SC is dealt as logical values. When the count result SC is "0", its logical value is regarded as "0" and "1" when the comprison result exceeds "0". The AND circuit 68 outputs a logical AND result between the comparison signal S52 and the count result SC as a signal S68.

The OR circuit 70 outputs a logical OR between the brake state signal S54 and the signal S68 as a brake lamp control signal SB. The brake lamp control signal SB indicates lighting of the brake lamp 34 when the brake lamp control signal SB is "1" and lights-out when the brake lamp control signal SB is "0". The buffer circuit 32 buffers the brake lamp control signal SB and turns on or off the brake lamp 34.

Operation

Next, with reference to FIGS. 2A to 2E, an embodiment of the present invention is described below. FIGS. 2A to 2E are charts showing waveforms at respect points in the vehicle 1.

In FIGS. 2A to 2C, the brake pedal command value BP*, the count result SC, and the brake lamp control signal SB are signals described referring to FIG. 1.

A signal SCX and a signal SBX (see FIGS. 2D and 2E) are signals in a comparative example described later. Since the waveforms in FIGS. 2A to 2E show a case in which an automatic following traveling is performed, an braking operation is performed automatically.

The brake pedal operation amount BP was "0" before time t2 in FIG. 2A, but has a value exceeding "0" at time t2. Accordingly, the brake state signal S54 outputted by the comparator 54 rises from "0" to "1" at time t2. The edge detecting circuit 58 outputs the reset signal RST, which resets the count result SC of the counter 64 to "0". The inverted brake status signal S56 outputted by the NOT circuit 56 becomes "0", so that the clock signal CL keeps "0". Accordingly, as shown in FIG. 2C, after time t2 the count result SC keeps "0".

Next, the brake pedal operation amount BP returns to "0" at time t4 in FIG. 2A. Accordingly, in FIG. 1, the brake state signal S54 falls to "0" from "1" at time t4, and the edge detecting circuit 58 outputs the reset signal RST. This resets the count result SC of the counter 64 to "0" at time t4. When the brake state signal S54 becomes "0", the inverted brake status signal S56 becomes "1", so that the clock signal S60 is supplied to the counter 64 as the clock signal CL as it is. Accordingly, the count result SC outputted by the counter 64 is increasing with time passage after time t4.

Next, at time t6 in FIG. 2A, the brake pedal operation amount BP increases to a value exceeding "0" again. Accordingly, the brake state signal S54 rises from "0" to "1" at time t6. Next, the edge detecting circuit 58 outputs the reset signal RST, so that the count result SC on the counter 64 is reset to "0". Further, at time t8 after time t6, the brake pedal operation amount BP returns to "0" again. Accordingly, the operation for the period from time t6 to t8 is the same as the operation for the period from time t2 to t4. More specifically, the count result SC is kept "0" for the period from time t6 to t8.

The brake pedal operation amount BP becomes "0" again at time t8; exceeds "0" at time t10 again; and becomes "0" at time t12. Accordingly, the operation for the period from time t8 to time t12 is the same as the operation for time t4 to t8. The operation for the period from time t12 to t18 is similar.

In the example as shown, when the brake pedal operation amount BP becomes "0" again at time t18, the brake pedal operation amount BP after time t18 is kept "0". Accordingly, the count result SC is increasing until the count result SC reaches the count limit value SL. When the count result SC becomes equal to the count limit value SL at time t22, the count result SC is reset. Time from when the count result SC is "0" to when the count result SC reaches the count limit value SL is called a counting-up time TB (predetermined interval).

It is desirable that the counting-up time TB is approximately 200 ms (millisecond) to 800 ms, and more desirable that the counting-up time TB is approximately 450 ms (millisecond) to 550 ms. The reason for making the counting-up time TB not smaller than 200 ms is that when the counting-up time TB is set to be shorter than 200 ms, the brake lamp 34 may repeat turn on and off in a short period, which may result in eysore for the driver on a following vehicle. Further, when the counting-up time TB is set to be longer than 800 ms, a period for which the brake lamp 34 turns on becomes too long though there is no braking operation.

The waveforms of the brake pedal operation amount BP and the count result SC for the interval from time t2 to t21 are studied again. For the period, either of the brake pedal operation amount BP or the count result SC has a value exceeding "0". In FIG. 1, when the brake pedal operation amount BP exceeds "0", the brake state signal S54 becomes "1". Further, when the count result SC has a value exceeding "0", the signal S68 becomes "1" as long as the comparison signal S52 is "1". Accordingly, because the brake state signal S54 or the signal S68 is kept "1" for the period from time t2 to t22 in FIGS. 2A to 2C, the brake lamp 34 keeps turning on for the same period, so that the brake lamp 34 keeps turned on for the period.

Meanwhile, when the brake pedal operation amount BP exceeds the operation amount BP1 in FIG. 1, the comparison signal S52 becomes "0", so that the brake lamp control signal SB becomes equal to the brake state signal S54. Accordingly, if the brake pedal operation amount BP is large (when it exceeds the operation amount BP1), the brake lamp 34 immediately turns off when the brake pedal operation amount BP returns to "0". When the brake pedal operation amount BP is large, this increases a response of turning on and off of the brake lamp 34 to the brake pedal operation amount BP.

Comparative Example 1

Next, to make an effect by the embodiment clear, a comparative example is examined below. First, as a Comparative example 1, a configuration is studied which turns on the brake lamp 34 when the brake pedal operation amount BP exceed "0", and when the brake pedal operation amount BP becomes "0", the brake lamp 34 is turned on.

With this configuration, the brake lamp 34 is repeatedly turned on and off at an extremely short period. For example, when the counting-up time TB is 500 ms in FIG. 2, the brake lamp 34 turns on and off repeatedly at a period of about 200 ms. This configuration may cause a problem of eyesore for the driver on the following vehicle.

Comparative Example 2

A counter measure to solve the problem in the comparative example can be considered in which when the brake pedal operation amount BP exceeds "1", the brake lamp control signal SB is made "1" only for the counting-up time TB. This counter measure is regarded as Comparative example 2.

The count result SCX shown in FIG. 2 is the count result SC in the second comparative example. However, once the count up is started, the count result SCX in the second comparative example is not reset on the way of counting and reaches the count limit value SL. Further, the brake lamp control signal SBX is the brake lamp control signal SB only in the second comparative example, and when the count result SCX exceeds "0", the brake lamp control signal SBX is turned to "1".

In the example shown in FIG. 2E, the brake lamp control signal SBX is kept "1" to time t14 until the counting-up time TB elapses after rising of the brake lamp control signal SBX at time t2. After this, when the brake pedal operation amount BP exceeds "0" again at time t16, from the instant, the brake lamp control signal SBX is kept "1" for the counting-up time TB up to time t20.

If the counting-up time TB is assumed as 500 ms, in the second comparative example, as shown in FIG. 2E, the brake lamp 34 may repeat turning on and off at a cycle of about 500 ms. In the second comparative example, though the blinking period is longer than that in the first comparative example, it is also an eyesore for the driver on the following vehicle.

Advantageous Effect

As described above, the brake lamp controller 50 according to the embodiment controls turning on and off states of the brake lamp 34 on the basis of the brake state signal S54 and after the the brake state signal S54 turned off ("0"), a turning on controllers (64, 68, and 70) to turn on the brake lamp 34 for the predetermined interval (TB). This prevents the brake lamp 34 from blinking at a short period, so that the brake lamp 34 is appropriately tuned on.

Further, the brake lamp controller 50 further includes the tilt sensor (gradient detector) 36 for detecting an rising gradient and falling gradient on the road on which the vehicle is running, and the count setting circuit 66 for lengthening the predetermined interval TB relative to that in the case of a flat road when a slope having a gradient not smaller than a predetermined value by the tilt sensor 36. This can lengthen the predetermined interval (TB) on the slope, so that the brake lamp 34 is more appropriately turned on.

Further, the brake lamp controller 50 further includes the reset controller 58 resets measuring the predetermined interval TB and restarts the measuring the predetermined time TB when the brake state signal S54 becomes an on-state ("1") before after the brake state signal S54 becomes an off state ("0"). This suppresses blinking of the brake lamp 34 at a period near the predetermined interval (TB), so that the brake lamp 34 can be more appropriately turned on.

Further, the brake lamp controller 50 further includes a turns off controller (the comparator 52) which immediately turns off the brake lamp 34 after the brake state signal S54 becomes an off state when the brake pedal operation amount BP for the brake exceeds the predetermined first operation amount BP1. This can increase a responsibility of turn-on and turn-off of the brake lamp 34 when the brake pedal operation amount BP is grater than the first operation amount BP1.

Modifications

The present invention is not limited to the embodiments described above and may be modified variously. The embodiments have been exemplified to clearly understand the present invention, and it is not necessary to include all components described above. It is also possible to add another component to the configuration of the embodiment or a part of the configuration is replaceable to another configuration. Further, control lines shown in the drawing are shown to such an extent that an explanation of the invention is necessary. Actually, almost all components are interactively connected. Modifications are, for example as follows:

(1) The brake lamp controller 50 shown in FIG. 1 can be realized using a storing medium recording a program or data and a computer using a CPU (Central Processing Unit) for executing a program.

(2) The comparator 52 shown in FIG. 1, is a comparator for comparing the brake pedal operation amount BP with the operation amount BP1. This may be a comparator for comparing a hydro pressure inside the hydraulic mechanism 21 with a predetermined hydro pressure threshold or a comparator for comparing a braking torque of the brake device 20 with a predetermined torque threshold, in place of the brake pedal operation amount BP.

(3) In the above-described embodiment, the example was described in which the brake pedal 22 is operated by the operation of the brake actuator 42. However, another configuration may be adopted in which the brake pedal 22 is not moved though the brake is automatically operated as disclosed in Japanese Patent application No. 2016-078753.

(4) In the embodiments described above, the count limit value SL was set in accordance with the detection result by the tilt sensor 36. However, the tilt sensor 36 is not always essential, but the tilt of the vehicle 1 may be estimated by various methods. Further, the count limit value SL may be constant irrespective of the gradient of the vehicle 1 or the slope on the road.

(5) In the above-described embodiment, the brake lamp controller 50 performs turn-on control of the brake lamp 34 in accordance with both the operation by the driver and the operation by the brake actuator 42. However, the brake lamp controller 50 may perform the turn-on control of the brake lamp 34 on the basis only on the operation of the brake actuator 42. In this case, it is preferable to install another circuit for performing a turn-on control of the brake lamp 34 in accordance with an operation of the brake pedal 22 by the driver.

DESCRIPTION OF REFERENCE SYMBOLS

1 vehicle
34 brake lamp
36 tilt sensor(gradient detector)
50 brake lamp controller
52 comparator (turn-off controller)
54 comparator(brake state signal output unit)
58 edge detecting circuit(reset controller)
64 counter(turn-on controller
66 count setting circuit(turn-on interval controller)
68 AND circuit (turn-on controller)
70 OR circuit (turn-on controller)
BP brake pedal operation amount (operation amount)
BP1 operation amount (first operation amount)
CL clock signal
RST reset signal
S52 comparison signal
S54 brake state signal
S56 inverted brake status signal
TB counting-up time (predetermined interval)

The invention claimed is:

1. A brake lamp controller comprising:
   a brake state signal output unit configured to output a brake state signal indicative of ON and OFF states of automatic braking operation for a brake device of a vehicle;
   a timer that measures a predetermined interval and resets itself when the predetermined interval has elapsed;
   a turn-on controller configured to:
   turn on a brake lamp when the brake state signal changes from the OFF state to the ON state, wherein the timer is reset; and
   turn on the brake lamp for the predetermined interval when the brake state signal changes from the ON state to the OFF state, wherein the timer is reset and started over; and
   a turn-off controller configured to turn off the brake lamp when the brake state signal indicates the OFF state, after the predetermined interval.

2. The brake lamp controller as claimed in claim 1, further comprising:
   a gradient detector configured to detect a rising gradient and a falling gradient of a road on which the vehicle runs; and
   a turn-on interval controller configured to lengthen the predetermined interval relative to the predetermined interval for a flat road when the gradient detector detects a gradient not smaller than a predetermined value.

3. The brake lamp controller as claimed in claim 1, wherein the turn-off controller is further configured to turn off the brake lamp when an operation amount of a brake pedal exceeds a first predetermined operation amount threshold immediately after the brake state signal indicates the OFF state.

4. A vehicle comprising the brake lamp controller as claimed in claim 1.

* * * * *